June 8, 1926.
W. M. HOLMES ET AL
1,587,836
GEAR REMOVING AND REPLACING DEVICE
Filed Dec. 13, 1924
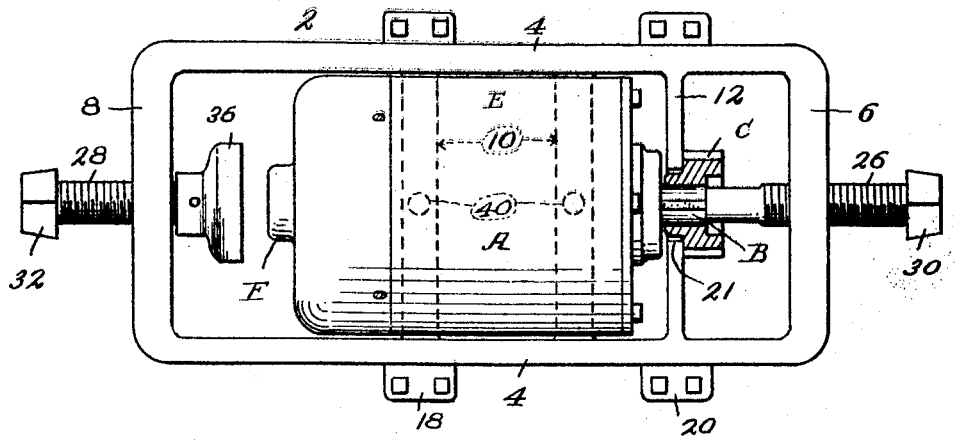
FIG. 1.
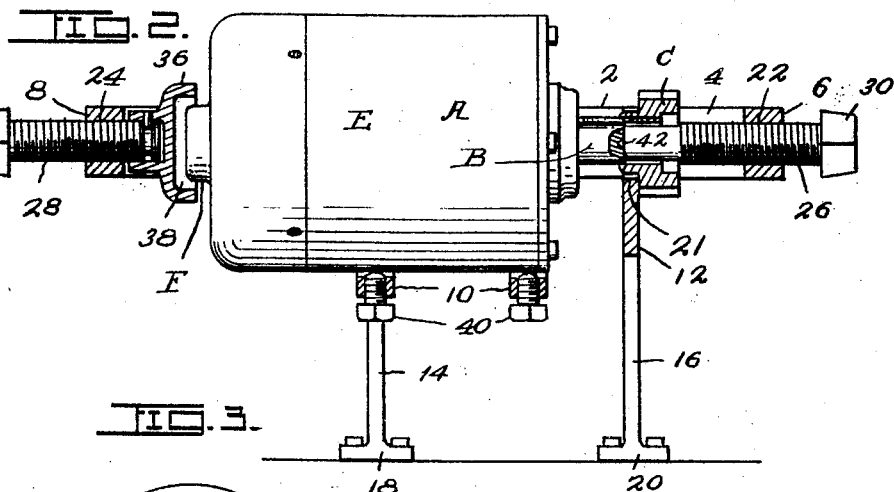
FIG. 2.
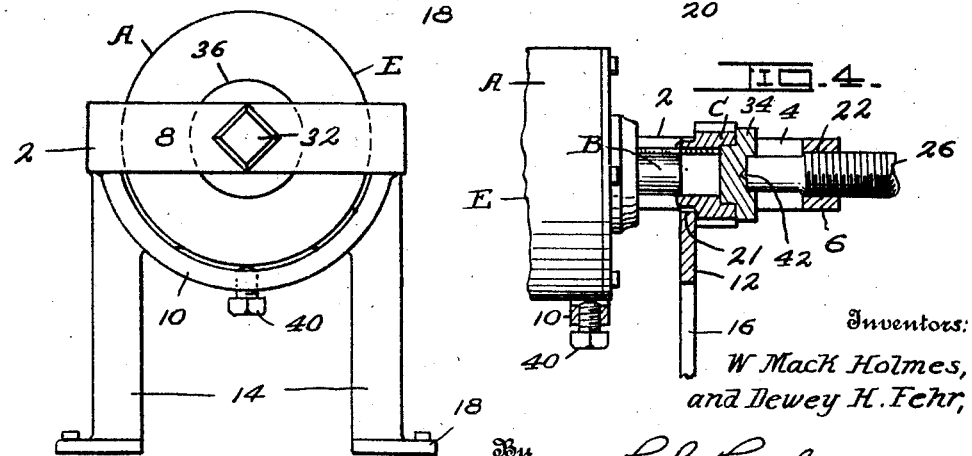
FIG. 3.
FIG. 4.
Witness:
Fred C. Fischer.
Inventors:
W Mack Holmes,
and Dewey H. Fehr,
By F. G. Fischer
Attorney.

Patented June 8, 1926.

1,587,836

UNITED STATES PATENT OFFICE.

W. MACK HOLMES AND DEWEY H. FEHR, OF PLEASANTON, KANSAS.

GEAR REMOVING AND REPLACING DEVICE.

Application filed December 13, 1924. Serial No. 755,759.

Our invention relates to devices for removing gears and other small wheels from their shafts and, also, for forcing them back upon said shafts, and our object is to provide a simple, inexpensive and efficient device of this character whereby the operation of removing or replacing said wheels may be quickly and accurately performed without damage to any of the parts.

In the accompanying drawing we have shown the device arranged for removing and replacing the gears of small electric generators such as are employed on motor vehicles, and in order that the invention may be fully understood, reference will now be had to said drawing, in which:

Fig. 1 is a plan view of the device in the act of removing the gear from the generator shaft.

Fig. 2 is a longitudinal section of the device showing the position of the parts after the gear has been removed from the shaft.

Fig. 3 is a rear elevation of the device with the generator in position thereon.

Fig. 4 is a fragmentary section showing some of the parts arranged for forcing the gear back upon the shaft.

Referring now in detail to the various parts, 2 designates a hollow rectangular frame consisting of longitudinal members 4, transverse front and rear members 6 and 8 uniting the ends of said longitudinal members 4, concave transverse members 10 uniting the intermediate portions of the longitudinal members 4, an abutment 12 between the transverse member 6 and the adjacent member 10, and legs 14 and 16 fixed to the rearmost transverse member 10 and the abutment 12 and terminating in feet 18 and 20, respectively, adapted to be bolted or otherwise secured to a work bench.

The abutment 12 has a centrally-disposed recess 21 to receive the hub of a gear C, and the front and rear transverse members 6 and 8 have centrally disposed bores 22 and 24, in which screws 26 and 28, respectively, are threaded. The screws 26 and 28 are provided at their outer ends with rectangular heads 30 and 32 in order that they may be rotated and thereby advanced, or retracted, by a suitable crank or wrench, not shown.

34 designates a removable abutment adapted to be applied to the inner end of the screw 26 when the gear wheel C is to be forced upon its shaft. The screw 28 has swiveled upon its inner end an abutment 36 provided with a socket 38, for a purpose which will hereinafter appear. The concave transverse members 10 are provided with adjustable supports in the form of set screws 40, for adjusting the generator A vertically to bring its shaft B in axial alinement with the screws 26 and 28. The screw 26 is provided at its inner end with an axially disposed tapered stud 42, which enters a corresponding recess in the adjacent end of the shaft B to prevent the same from moving out of axial alinement with said screw 26 while the gear C is being removed. The abutment 34 also has a centrally disposed recess to receive the stud 42.

When a short-circuit or other injury to the armature of the generator A develops, it is necessary to remove the gear C from the shaft B before said armature can be removed from the cylindrical housing E. Removal of the gear C is accomplished by positioning the generator A upon the set screws 10, which are adjusted vertically to bring the shaft B into axial alinement with the screws 26 and 28. In placing the generator A upon the set screws 10 the gear C is placed against the abutment 12 as shown by Figs. 1, 2 and 4. The screw 26 is then adjusted forwardly to force the shaft B backwardly with the generator A, as shown by Fig. 2, while the gear C is held from backward movement by the abutment 12. After the gear C has been removed from the shaft B and the necessary repairs have been made on the generator A, the same is placed back in position on the screws 10 and the removable abutment 34 is applied to the inner end of the screw 26 with the gear wheel C in position upon said abutment 34, as shown by Fig. 4. The screw 26 is then advanced to bring the gear C against the abutment 12, after which the screw 28 is advanced to force the generator A and the shaft B to the right until said shaft B has been forced to the proper position within the gear C.

When replacing the gear C upon the shaft B the hub F of the generator A fits within the socket 38 of the abutment 36 and thereby prevents said generator A from moving upwardly out of axial alinement with the screw 28 and possibly damaging some of the parts.

From the foregoing description it is apparent that we have provided a device embodying the advantages above pointed out, and while we have shown and described the preferred construction, combination and arrangement of parts, we reserve the right to make such changes as properly fall within the spirit and scope of the invention as claimed.

Having thus described our invention, what we claim and desire to secure by Letters Patent, is:

1. A machine of the character described consisting of a frame embodying concave members and an abutment and adapted to support a machine having a shaft with a wheel mounted thereon, a member operably mounted in said frame and adapted to cooperate with said abutment in removing the wheel from the shaft, and elements threaded in the concave members for adjusting the machine to bring the shaft in axial alinement to said member.

2. A device of the character described consisting of a frame adapted to support a machine having a shaft with a wheel mounted thereon, a member threaded in one end of said frame and adapted to coact therewith in effecting removal of the wheel from the shaft, and a second member threaded in the opposite end of the frame to coact with the first-mentioned member in effecting replacement of the wheel upon the shaft.

In testimony whereof we affix our signatures.

W. MACK HOLMES.
DEWEY H. FEHR.